United States Patent

Mukai et al.

(10) Patent No.: US 8,755,973 B2
(45) Date of Patent: Jun. 17, 2014

(54) VEHICULAR POWER SUPPLY SYSTEM

(71) Applicant: Denso Corporation, Kariya (JP)

(72) Inventors: Yasuhiko Mukai, Anjo (JP); Hideki Kabune, Nagoya (JP); Toshihisa Yamamoto, Anjo (JP)

(73) Assignee: Denso Corporation, Kariya (JP)

( * ) Notice: Subject to any disclaimer, the term of this patent is extended or adjusted under 35 U.S.C. 154(b) by 22 days.

(21) Appl. No.: 13/717,772

(22) Filed: Dec. 18, 2012

(65) Prior Publication Data

US 2013/0184937 A1 Jul. 18, 2013

(30) Foreign Application Priority Data

Jan. 13, 2012 (JP) .................................... 2012-5524

(51) Int. Cl.
*B62D 5/00* (2006.01)
*B62D 5/04* (2006.01)
*B62D 5/10* (2006.01)

(52) U.S. Cl.
USPC .......................................... 701/41; 180/443

(58) Field of Classification Search
CPC ........ B62D 5/006; B62D 5/00; B62D 5/0481; B62D 5/003; H02M 3/156
USPC ......... 701/22, 36, 41–48; 180/65.1, 400, 412, 180/443; 307/139, 9.1, 49, 125–131, 132 E; 323/282
See application file for complete search history.

(56) References Cited

U.S. PATENT DOCUMENTS

| | | | |
|---|---|---|---|
| 6,052,633 A * | 4/2000 | Fukuyama et al. ............. 701/41 |
| 2002/0068655 A1 * | 6/2002 | Yamada et al. .................. 475/5 |
| 2006/0125320 A1 * | 6/2006 | Namba et al. ................ 307/10.1 |
| 2009/0021077 A1 * | 1/2009 | Zilberberg ....................... 307/66 |
| 2009/0101428 A1 * | 4/2009 | Itoh ............................... 180/197 |
| 2010/0022828 A1 * | 1/2010 | Ono et al. ...................... 600/109 |
| 2010/0318248 A1 * | 12/2010 | Higuchi et al. ................. 701/22 |
| 2013/0050880 A1 * | 2/2013 | Rozman et al. ................. 361/18 |

FOREIGN PATENT DOCUMENTS

| | | |
|---|---|---|
| JP | 7-288901 | 10/1995 |
| JP | 10032925 A * | 2/1998 |
| JP | P4120310 | 5/2008 |
| JP | 2009-011040 | 1/2009 |
| JP | 2011-148420 | 8/2011 |
| JP | P2011-155788 A | 8/2011 |

OTHER PUBLICATIONS

Office Action (2 pages) dated Jan. 9, 2014 issued in corresponding Japanese Application No. 2012-005524 and English translation (3 pages).

* cited by examiner

*Primary Examiner* — Mary Cheung
*Assistant Examiner* — Rodney Butler
(74) *Attorney, Agent, or Firm* — Nixon & Vanderhye PC

(57) ABSTRACT

In a vehicular power supply system, a main battery supplies electric power to both main machine drive circuit, which drives a main motor for driving a vehicle, and a steering assist drive circuit, which drives a steering assist motor of a power steering apparatus. A main machine switching circuit, which is capable of shutting off power supply to the main machine drive circuit, and an auxiliary machine switching circuit, which is capable of shutting off power supply to the steering assist drive circuit are provided in parallel. As long as the auxiliary machine switching circuit is turned on, power supply to the steering assist drive circuit is continued even when the main machine switching circuit is turned off.

4 Claims, 6 Drawing Sheets

COMPARATIVE EXAMPLE

VEHICULAR POWER SUPPLY SYSTEM

CROSS REFERENCE TO RELATED APPLICATION

The present application is based on and incorporates herein by reference Japanese patent application No. 2012-5524 filed on Jan. 13, 2012.

TECHNICAL FIELD

The present disclosure relates to a vehicular power supply system, which supplies power for driving a vehicle from a high-voltage battery.

BACKGROUND ART

In a conventional electric vehicle or hybrid vehicle, a power supply system supplies electric power to a main motor, which drives a vehicle. For example, in a power supply system according to JP 4120310, a main motor voltage converter is provided to output a voltage to a drive circuit of a main motor, and a system relay is provided between a DC power source and the main motor voltage converter. An auxiliary machine load drive circuit is provided between the system relay and the main motor voltage converter in parallel to the main motor voltage converter relative to the DC power source. Thus the power of the DC power source is divided and supplied to the main motor voltage converter and the auxiliary load drive circuit through the common system relay. The auxiliary machine load drive circuit is exemplified as a drive circuit for a power steering apparatus or a braking apparatus.

It is possible to reduce the number of batteries by sharing the DC power source for driving the main motor without providing a battery exclusive to a drive circuit of each auxiliary machine drive circuit. The voltage of the main motor drive battery is higher than that of the battery provided exclusively to the auxiliary machine. By using a higher voltage by the auxiliary machine drive circuit, a current required to provide the same power is reduced. As a result, current loss, which is proportional to the square of a current, is reduced and efficiency of power is improved.

According to JP 4120310, when the system relay turns off to shut off power supply upon failure or the like of the main motor or the main motor drive circuit, power supply to the auxiliary machine load is also simultaneously shut off and the auxiliary machine is disabled to operate. If a power steering apparatus or a brake apparatus, which relates to a function of turning and stopping of a vehicle, is disabled to operate, the steering assist operation and the braking operation of the vehicle are disabled. If a hold signal, which continues to hold the system relay in the on-state under a predetermined condition, is generated to ensure the continued operation of the auxiliary machine, the control becomes complicated and control calculation load increases.

SUMMARY

It is therefore an object to provide a vehicular power supply system, which prevents power supply to a steering assist drive circuit from being shut off due to interruption or disconnection of a power supply path caused by failure of a main machine in the vehicular power supply system, in which a steering assist drive circuit of an electric power steering apparatus is supplied with power from a high voltage battery.

According to one aspect, a vehicular power supply system comprises a main motor for driving a vehicle, a main drive circuit for driving the main motor, a steering assist motor for assisting a steering operation of the vehicle, a steering assist drive circuit for driving the steering assist motor, and a battery for supplying power to the main machine drive circuit and the steering assist drive circuit.

The vehicular power supply system further comprises a main machine switching circuit provided between the battery and the main machine drive circuit and capable of shutting off power supply from the main battery to the main machine drive circuit. The vehicular power supply system further comprises an auxiliary machine switching circuit provided between the battery and the steering assist drive circuit in parallel to the main machine drive circuit relative to the battery and capable of shutting off power supply from the battery to the steering assist drive circuit.

BRIEF DESCRIPTION OF THE DRAWINGS

The above and other objects, features and advantages of a vehicular power supply system will become more apparent from the following detailed description made with reference to the accompanying drawings. In the drawings.

DETAILED DESCRIPTION OF EMBODIMENT

Figure 1:
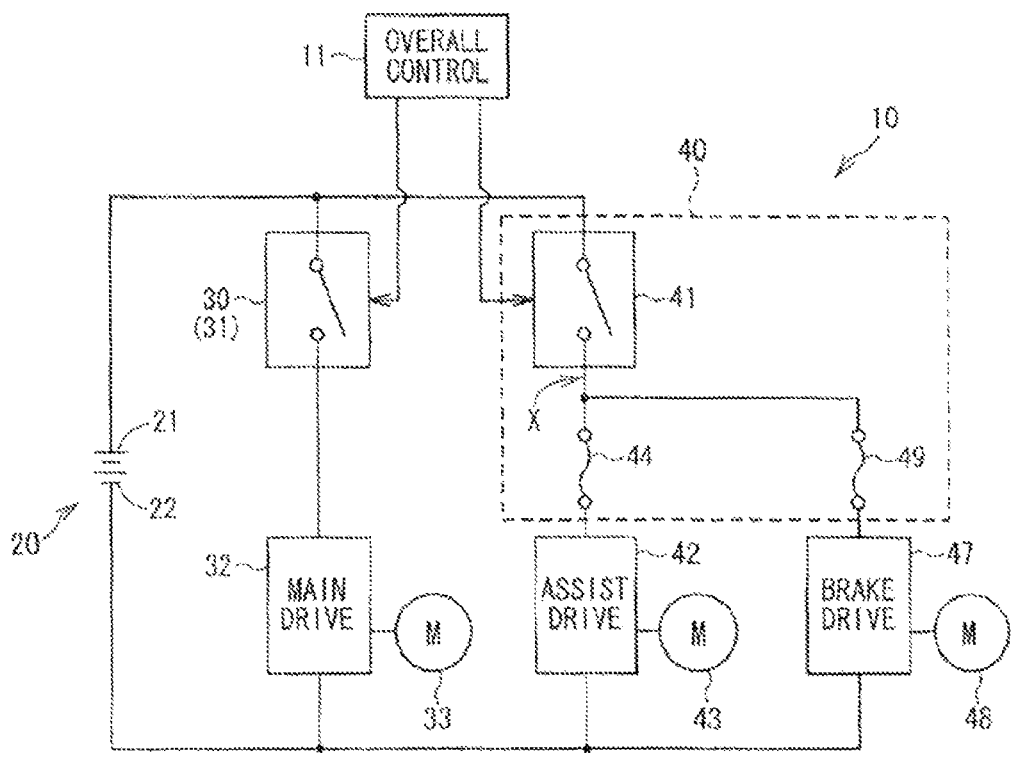
FIG. 1 is a schematic block diagram of a vehicular power supply system according to a first embodiment.

A vehicular power supply system will be described below with reference to plural embodiments shown in the drawings. In the description of the following embodiments, substantially the same configuration is designated by the same reference numerals to simplify the description.

The vehicular power supply system is mounted in an electric vehicle or a hybrid vehicle for supplying electric power to each apparatus, which performs a main function of "travel, turn and stop" and other functions of a vehicle. Apparatuses, which drive a vehicle, that is, perform a function of "travel" of a vehicle, are each referred to as a main machine. Other apparatuses are referred to as auxiliary machines. Among the auxiliary machines, particularly apparatuses for steering a vehicle and braking a vehicle, that is, for performing the function of "turning" and the function of "stopping" are referred to as specified auxiliary machines. Specifically, the specified auxiliary machine includes an electric power steering apparatus and an electric braking apparatus in the following embodiments. Each of the main machine and the auxiliary machine is normally formed of an actuator such as an electric motor, and a drive circuit, which drives the actuator.

First Embodiment

Figure 2:
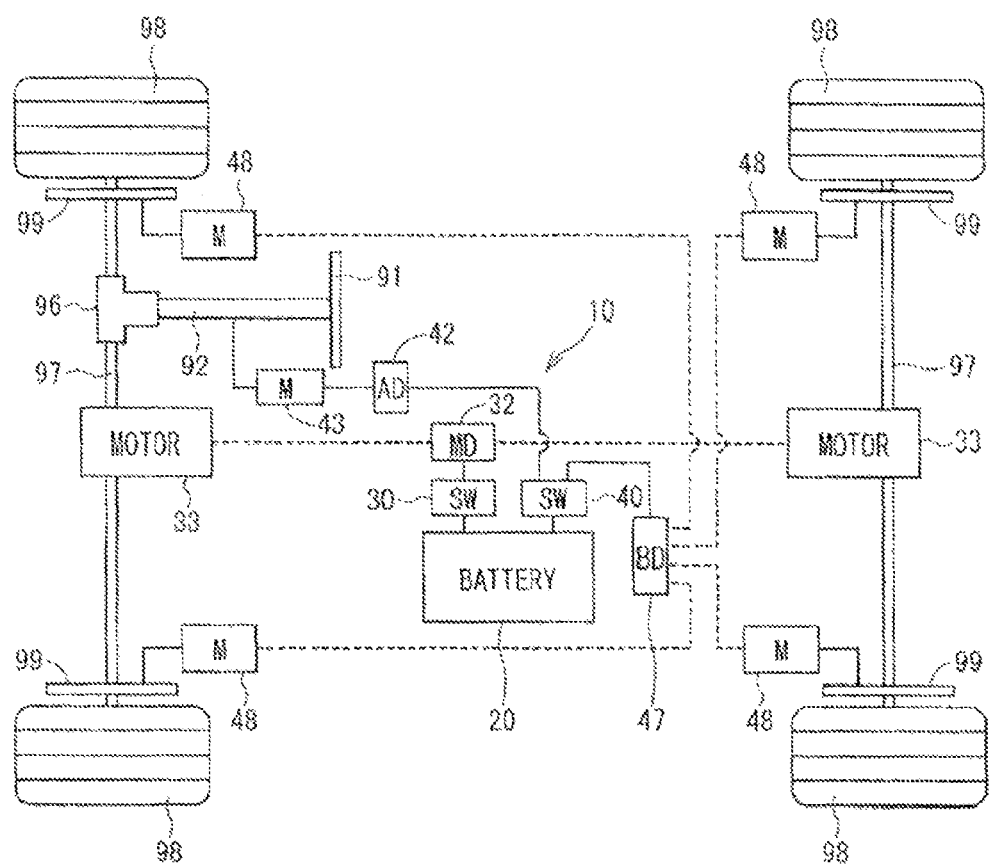
FIG. 2 is a schematic view of a vehicle incorporating the vehicular power supply system according to the first embodiment shown in FIG. 1.

A vehicular power supply system according to a first embodiment is shown in FIG. 1 and FIG. 2. As shown in FIG. 2, a vehicular power supply system 10 includes main motors 33, a steering assist motor 43, brake motors 48 and drive circuits 32, 42 and 47 for respectively driving those corresponding motors. A main machine drive circuit 32 is configured to drive the main motors 33, a steering assist drive circuit 42 is configured to drive the steering assist motor 43 and a brake drive circuit 47 is configured to drive the brake motors 48, which are provided as a brake actuator.

As understood from FIG. 1, in which the main motors 33 and the brake motors 48 are illustrated as one motor, respectively, the main machine drive circuit 32, the steering assist drive circuit 42 and the brake drive circuit 47 are connected in parallel relative to a main battery 20. The main battery 20 is a high-voltage DC battery, which supplies a high voltage of a potential difference of 288 V, for example, between a high potential side electrode 21 and a low potential side electrode 22. All of those drive circuits 32, 42 and 47 are supplied with electric power from the main battery 20. A main machine switching circuit 30 is provided between the main battery 20 and the main machine drive circuit 32. An auxiliary machine switching circuit 40 is provided between the main battery 20 and the steering assist drive circuit 42 as well as the brake drive circuit 47. The main machine switching circuit 30 and the auxiliary machine switching circuit 40 are capable of interrupting power supply from the main battery 20 to a corresponding drive circuit, in which a failure such as a short-circuit arises to cause an excessive current flow.

As shown in FIG. 2, the electric power steering apparatus provides a steering shaft 92 with a steering assist torque, which is produced from an output torque of the steering assist motor 43 through speed reduction, to power-assist a steering operation of a steering wheel 91 of a driver. A pinion gear 96 is provided at a longitudinal end of the steering shaft 92 and gear-engaged with a rack shaft 97. A pair of tire wheels 98 is coupled to both ends of the rack shaft 97 rotatably through tie rods and the like. The rotary motion of the steering shaft 92 is converted into a linear motion of the rack shaft 97 by the pinion gear 96 so that the pair of tire wheels 98 are steered by an angle corresponding to the length of linear movement of the rack shaft 97.

The steering assist drive circuit 42 includes a power converter, which supplies the steering assist motor 43 with power by converting DC power of the main battery 20, and a steering assist control circuit, which controls output power of the power converter. For example, a three-phase inverter may be used as an electric power converter in a case that the steering assist motor 43 is a three-phase AC brushless motor. Alternatively, a DC/DC converter may be used as the electric power converter in a case that the steering assist motor 43 is a DC motor.

The steering assist control circuit is implemented as an ECU, that is, an electronic control unit. The steering assist control circuit calculates an assist current command value based on input signals of a steering torque applied by a driver and a present travel speed as well as an input signal of a rotation angle fed back from the steering assist motor 43, and outputs the calculated command value to the power converter. The electric brake apparatus presses a brake rotor 99 provided in correspondence to the tire wheels 98 by the output torque of the brake motor 48 thereby to brake the vehicle. In some vehicles, which is heavy in weight and needs large force to press the brake rotor 99, the output torque of the brake motor 48 is used to drive a hydraulic pump to press the brake rotor 99 by the pressure of the hydraulic pump thereby to brake the vehicle.

In the vehicular power supply system 10, the steering assist drive circuit 42 for driving the steering assist motor 43 and the brake drive circuit 47 for driving the brake motor 48 are not connected to respective batteries provided exclusively thereto. Rather the steering assist drive circuit 42 and the brake drive circuit 47 share the main battery 20, which is primarily provided for driving the main motor 33 by the main machine drive circuit 32. Thus the batteries mounted in the vehicle can be reduced in number. In a case that the steering assist drive circuit 42 is connected to a battery provided exclusively thereto, the battery generally outputs a low voltage of about 14 V. The main battery 20 however outputs about 288 V. That is, the main battery 20 outputs a voltage much higher than a voltage, which is required to drive the steering assist motor 43. Since the steering assist drive circuit 42 uses the higher voltage, the current required to acquire the same level of power is reduced. As a result, the current loss, which is proportional to the square of current, can be reduced and power efficiency is improved.

The main machine switching circuit 30 is provided between the main battery 20 and the main machine drive circuit 32 in series thereto. The auxiliary machine switching circuit 40 is provided, between the main battery 20 and the steering assist drive circuit 42 as well as the brake drive circuit 47 in series. The main machine switching circuit 30 and the auxiliary machine switching circuit 40 are connected in parallel relative to the main battery 20.

The main machine switching circuit 30 is formed of a main machine relay 31, for example, which operates as an on/off switch. The auxiliary machine switching circuit 40 is formed of an auxiliary machine relay 41, a first fuse 44 and a second fuse 49. The main machine relay 31 and the auxiliary machine relay 41 are on/off switches. The first fuse 44 is connected in series with the steering assist drive circuit 42. The second fuse 49 is connected in series with the brake drive circuit 47. The first fuse 44 and the second fuse 49 are connected in parallel at an output side of the auxiliary machine relay 41 opposite to an input side connected to the main battery 20.

The main machine relay 31 and the auxiliary machine relay 41 are switchable to a conduction (on) state and a non-conduction (off) state by electric signals from an overall control circuit 11. The overall control circuit 11 presidingly controls the conduction state and the non-conduction state in the vehicular power supply system 10. The relay is a device, which is switchable between an on-state and an off-state by the electric signal or a breaker such as a circuit protector. The first fuse 44 and the second fuse 49 blow when currents of more than rated currents flow, respectively. The fuses 44 and 49 are non-recoverable once broken and need replacement with new ones. Fuses cost less than relays.

The main machine relay 31 and the auxiliary machine relay 41 are configured to normally turn on and off in conjunction with an ignition switch (not shown) of the vehicle. When the main machine relay 31 is turned on, electric power is supplied from the main battery 20 to the main motor 33 thereby to enable the vehicle to travel by the drive power of the drive motor 33. When the auxiliary machine relay 41 is turned on and the first fuse 44 is not broken, electric power is supplied to the steering assist motor 43 thereby to enable the driver to steer the vehicle by using the steering assist torque of the steering assist motor 43. When the auxiliary machine relay 41 is turned on and the second fuse 49 is not broken, electric power is supplied to the brake motor 48 thereby to enable the driver to brake the vehicle with brake force boosted by the brake motor 48.

In a normal operation, the current flows from the high potential side electrode 21 of the main battery 20 to the low potential side electrode 22 through three paths. The first path is formed of the main machine relay 31 and the main machine drive circuit 32. The second path is formed of the auxiliary machine relay 41, the first fuse 44 and the steering assist drive circuit 42. The third path is formed of the auxiliary machine relay 41, the second fuse 49 and the brake drive circuit 47. The second fuse 49 and the brake drive circuit 47 branch off from the auxiliary machine relay 41 to be in parallel thereto. Since the main machine relay 31 and the auxiliary machine relay 41 are turned off when the ignition switch is turned off, a leak current is prevented from leaking from the main battery 20. This is advantageous in that power consumption of the main battery 20 is suppressed when the vehicle is not used for a long period of time.

Figure 6:
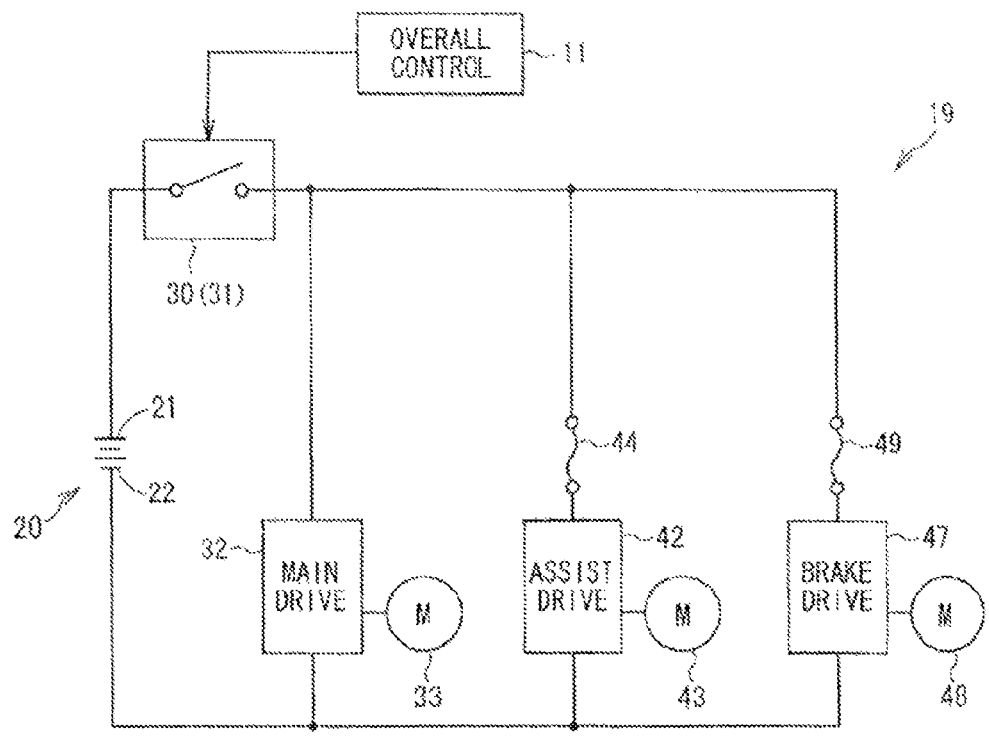
FIG. 6 is a schematic circuit diagram of a vehicular power supply system according to a comparative example.

The operation and advantage of the first embodiment configured as above will be described in comparison with a comparative example, which is shown in FIG. 6. In a vehicular power supply system 19 according to the comparative example, the steering assist drive circuit 42 and the brake drive circuit 47 are connected in parallel with the main machine drive circuit 32 through the fuses 44 and 49 at a side of the main machine switching circuit 30 opposite to the main battery 20. That is, the main machine switching circuit 30 is provided between the main battery 20 and three drive circuits 32, 42, 47. When a failure such as a short-circuit or grounding arises in any one of the drive circuits 32, 42 and 47, the main machine switching circuit 30 is turned off. As a result, the function of the drive circuits 32, 42 and 47, that is, functions of travel, turn and stop of the vehicle, are all disabled at the same time.

According to the first embodiment, on the contrary, the main machine switching circuit 30 and the auxiliary machine switching circuit 40 are provided in parallel relative to the main battery 20. Even when the switching circuit 30 is turned off by a failure of the main machine drive circuit 32, for example, the power supply is continued to the steering assist drive circuit 42 and the brake drive circuit 47 as long as the auxiliary machine switching circuit 40 is in the on-state. Therefore, when the main machine switching circuit 30 turns off and the main motor 33 stops rotating for some reason while the vehicle is traveling, it is possible to persistently use the power steering apparatus and the brake apparatus while the vehicle travels by inertia. For example, with the steering assist torque, the driver can drive the vehicle to a road shoulder, decelerate and stop by braking. Since it is not necessary to perform complicated control such as generating a hold signal for maintaining a system relay in the on-state as in the conventional system, processing load for the control calculation can be reduced.

According to the first embodiment, the auxiliary machine switching circuit 40 includes the first fuse 44 and the second fuse 49. Generally a fuse melts and breaks a current flow path, when an excessive current flows due to failure, for example, a short-circuit of a load. However, since a current value, which causes breakage of the fuse, varies, it is hard to select a fuse of appropriate rating in a case that a power source voltage is not so high and a current increases to only at most several times of that of normal time even at the time of short-circuit failure. That is, if the fuse is selected with priority that it does not break in the normal operation, it may not break even in the case of short-circuit failure. If the fuse is selected with priority that it surely breaks in the case of short-circuit failure, it may break even in the normal operation. For this reason, it is sometimes necessary to use high-cost devices such as a circuit-breaker in place of a fuse.

According to the first embodiment, the voltage of the main battery 20 is as high as about 288 V and is far higher than a voltage, about 14 V, which is generally required for the power steering apparatus and the brake apparatus. For this reason, a current of about several hundreds of amperes will flow at the time of the short-circuit failure relative to a normal current of about several amperes. It is thus possible to provide a current difference, which is sufficiently larger than a range of variation in the breakage current of the fuse. As a result, it is possible to use the fuse without being broken under the normal operation and melt the fuse surely at the time of failure.

According to the first embodiment, the auxiliary machine relay 41 and the first fuse 44 are connected in series, and the auxiliary machine relay 41 and the second fuse 49 are connected in series. A threshold current for turning off the auxiliary machine relay 41 is set to be far higher than threshold currents for melting fuses 44 and 49.

Thus, when the auxiliary machine relay 41 and the first fuse 44 or the second fuse 49 are grounded at a point X shown in FIG. 1, the auxiliary machine relay 41 is turned off. In this case, the electric conduction can be recovered by removing the cause of grounding and turning on the auxiliary machine relay 41. When the grounding failure arises in the steering assist drive circuit 42 or the brake drive circuit 47, the fuse 44 or 49 melts before the auxiliary machine relay 41 is turned off. Thus, when the steering assist drive circuit 42 fails, for example, only the fuse 44 melts and the power supply to the brake drive circuit 47 can be continued.

Second Embodiment

Figure 3:
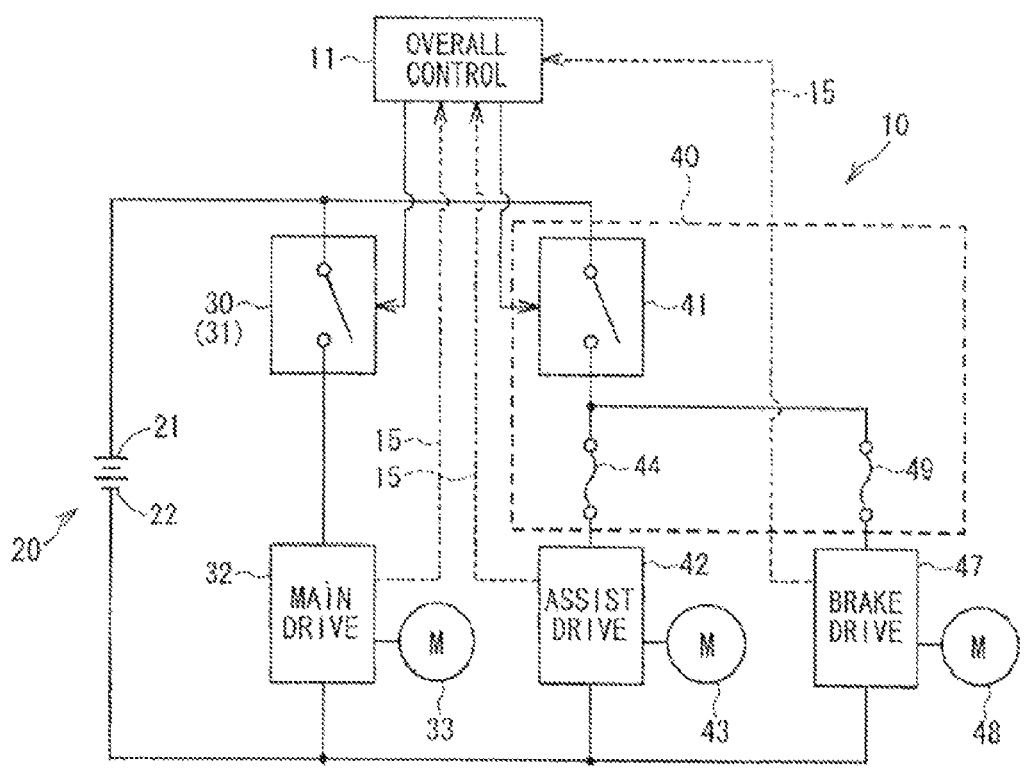
FIG. 3 is a schematic block diagram of a vehicular power supply system according to a second embodiment.

According to a second embodiment shown in FIG. 3, the overall control circuit 11 is positioned physically away from the main machine drive circuit 32, the steering assist drive circuit 42 and the brake drive circuit 47, and connected via a communication device 15. The communication device 15 may be electric signal wires, which connect physically distanced devices, and various wireless devices, which use light, magnetism, radio wave.

If it is assumed that a failure such as a short-circuit or grounding arises in the main machine drive circuit 32 and an excessive current flows, the main machine relay 31, that is, the main machine switching circuit 30 turns off. The overall control circuit 11 receives a signal from the main machine drive circuit 32 through the communication device 15 and recognizes that the main machine switching circuit 30 turned off. The overall control circuit 11 receives signals from the steering assist drive circuit 42 and the brake drive circuit 47 through the communication device 15 and recognizes that the drive circuits 42 and 47 are normal. Thus, the auxiliary machine relay 41 maintains its on-state and continues to supply power to the steering assist drive circuit 42 and the brake drive circuit 47.

Since the overall control circuit 11 is thus connected to the drive circuits 32, 42 and 47 through the communication device 15, the overall control circuit 11 can be located at any position without limitation. By locating the overall control circuit 11 at a position, which is not affected so much by collision of a vehicle, it is possible to protect the overall control circuit 11 from damage and ensure reliability of the system.

Third Embodiment

Figure 4:
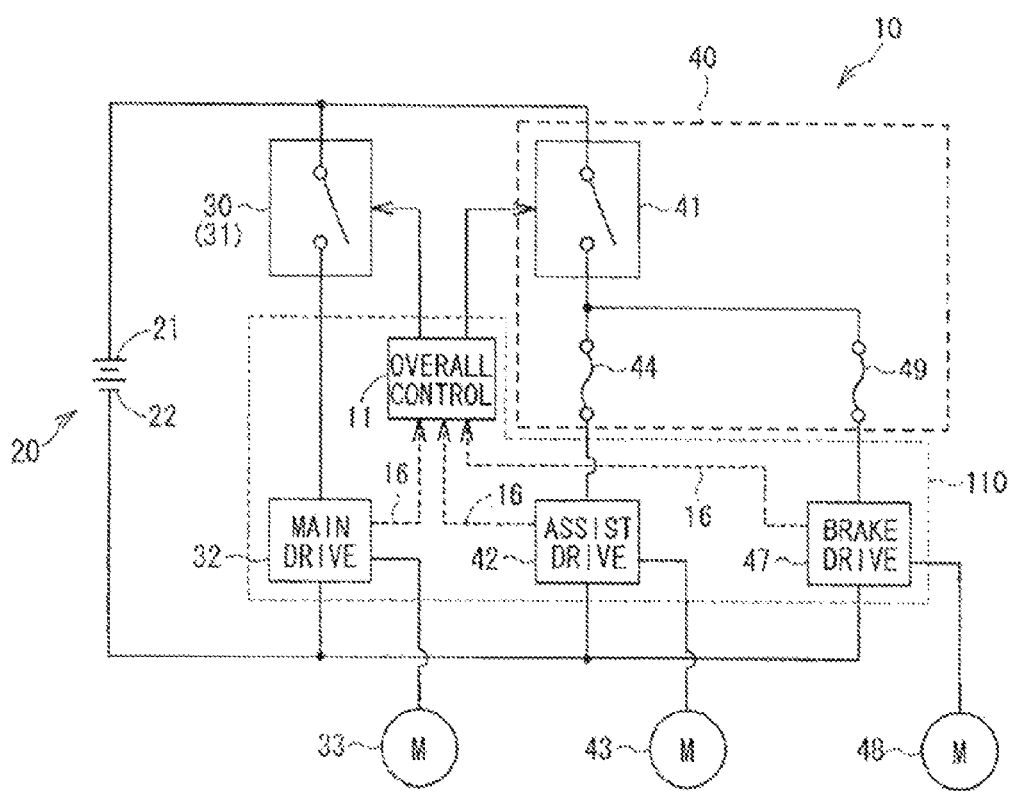
FIG. 4 is a schematic block diagram of a vehicular power supply system according to a third embodiment.

According to a third embodiment shown in FIG. 4, the overall control circuit 11 is connected with the drive circuits 32, 42 and 47 in a different manner from the second embodiment.

The overall control circuit 11 is mounted on a single control unit substrate 110 together with the drive circuits 32, 42 and 47 and connected by an internal signal conductor 16. That is, the overall control circuit 11 is not separated physically away contrary to the second embodiment. Since the circuits 11, 32, 42 and 47 are integrated on the single substrate and the communication device 15 of the second embodiment is not used, it is possible to reduce the physical size and reduce costs.

Fourth Embodiment

Figure 5:
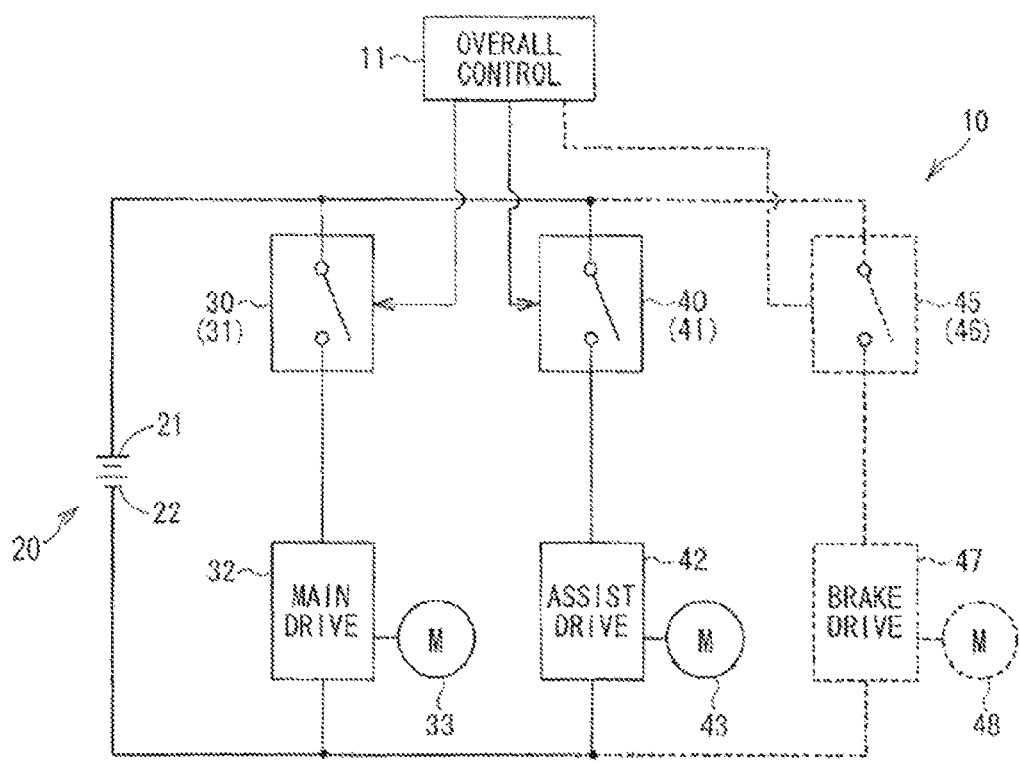
FIG. 5 is a schematic block diagram of a vehicular power supply system according to a fourth embodiment.

According to a fourth embodiment shown in FIG. 5, the auxiliary machine switching circuit 40 is formed of only the auxiliary machine relay 41, which is exclusive to the steering assist drive circuit 42 as shown by a solid line. The auxiliary machine switching circuit 40 is connected in parallel to the main machine switching circuit 30 relative to the main battery 20.

According to the third embodiment shown in FIG. 4, when a failure such as a short-circuit arises in the steering assist drive circuit 42, the auxiliary machine relay 41 is turned off so that only the steering assist apparatus related to the function of "turn" is stopped. In this case, no fuse need be provided between the auxiliary machine relay 41 and the steering assist drive circuit 42. The brake device need not share the main battery 20 but may be powered by a battery provided exclusively thereto.

In a case that not only the steering assist drive circuit 42 but also the brake drive circuit 47 are connected to the main battery 20 as shown by broken lines in FIG. 5, a relay 46 provided exclusively to the brake drive circuit 47 forms another auxiliary machine switching circuit 45. No fuse need be provided between the relay 46 and the brake drive circuit 47 either. Thus, since only the auxiliary machine relay 41 turns off when the steering assist drive circuit 42 becomes abnormal and only the relay 46 turns of when the brake drive circuit 47 becomes abnormal, these drive circuits 42 and 47 do not affect each other. Since no fuse is used, the system can recover its normal operation condition by removing the cause of abnormality and then turning on the relays 41 and 46.

Other Embodiments

In the above-described embodiments, the drive circuit 43 of the power steering apparatus and the drive circuit 47 of the brake apparatus are connected to the main battery 20 in parallel in the vehicular power supply system 10 as the specified auxiliary machine, which ensures the function of "turn and stop" of the vehicle.

As other embodiments, a drive circuit for an auxiliary machine other than the specified auxiliary machine may be connected to the main battery 20. Such an auxiliary machine other than the specified auxiliary machine may be, for example, a power window, an air-conditioner blower, a wiper or the like. Differently from the specified auxiliary machine, such auxiliary machines will not affect adversely so much even when the respective functions thereof are lost at the same time as the vehicle is disabled to travel. Therefore, the drive circuits of those auxiliary machines may be connected to a junction between the main machine relay 31 and the main machine drive circuit 32 through respective fuses, for example. It is thus possible to attain, by inexpensive fuses, the shut-off function for each auxiliary machine and reduce the number of relays.

What is claimed is:

1. A vehicular power supply system comprising:
a main motor for driving a vehicle;
a main machine drive circuit for driving the main motor;
a steering assist motor for assisting a steering operation of the vehicle;
a steering assist drive circuit for driving the steering assist motor;
a brake actuator for braking the vehicle;
a brake drive circuit for driving the brake actuator;
a battery for supplying power to the main machine drive circuit, the steering assist drive circuit and the brake drive circuit;
a main machine switching circuit provided between the battery and the main machine drive circuit and capable of shutting off power supply from the battery to the main machine drive circuit; and
an auxiliary machine switching circuit provided between the battery and both of the steering assist drive circuit and the brake drive circuit and in parallel to the main machine drive circuit relative to the battery, the auxiliary machine switching circuit being capable of shutting off power supply from the battery to the steering assist drive circuit and the brake drive circuit,
wherein the battery outputs a voltage higher than a voltage, which is required to drive the steering assist motor and the brake actuator, and
wherein the auxiliary machine switching circuit includes a switch, a first fuse and a second fuse, the switch being capable of switching between conduction and non-conduction, the first fuse being connected in series between the switch and the steering assist drive circuit, and the second fuse being connected in series between the switch and the brake drive circuit.

2. The vehicular power supply system according to claim 1, further comprising:
an overall control circuit for controlling the main machine switching circuit and the auxiliary machine switching circuit,
wherein the overall control circuit maintains conduction of the auxiliary machine switching circuit to continue power supply from the battery to the steering assist drive circuit as long as the steering assist drive circuit is normal, even when the main machine switching circuit is in a non-conduction state.

3. The vehicular power supply system according to claim 2, further comprising:
a communication device provided between the overall control circuit and the main machine drive circuit as well as the steering assist drive circuit, which are located at a position physically distanced from the overall control circuit,
wherein the overall control circuit is configured to recognize that the main machine switching circuit is turned off and the steering assist drive circuit is normal based on signals transmitted through the communication device.

4. The vehicular power supply system according to claim 1, wherein the first fuse and the second fuse are connected in parallel to an output side of the switch of the auxiliary machine switching circuit opposite to an input side connected to the battery.

* * * * *